UNITED STATES PATENT OFFICE.

MARTHA E. AUSTIN, OF NEW ORLEANS, LOUISIANA.

SALVE.

SPECIFICATION forming part of Letters Patent No. 379,500, dated March 13, 1888.

Application filed December 9, 1887. Serial No. 257,451. (No specimens.)

*To all whom it may concern:*

Be it known that I, MARTHA E. AUSTIN, of New Orleans, in the parish of Orleans and State of Louisiana, have invented a new and useful Composition of Matter to be Used as a Salve, of which the following is a specification.

My composition, which is to be used as a salve for the healing of various sores, both poisonous and otherwise, including scalds and burns, consists of the following ingredients, combined in about equal proportions, viz: rattlesnake's master, (*Agave Virginica*,) frog's oil, white rosin from the yellow pine, hog's lard, and beeswax.

I usually make one pint of the compound at a time with the above ingredients, in five equal parts, and my method of preparing it is as follows: I first take the herb *Agave Virginica*, commonly known as "Rattlesnake's master," which grows sparsely on the gulf coast of America and elsewhere, and make a strong decoction thereof. To this decoction I add the frog-oil, which is obtained by heat, as other animal oils are obtained, and also add the other ingredients above named, all in about equal proportions, and boil the whole mass in a porcelain-lined or other suitable vessel until the same assumes a proper consistence to be strained through a fine muslin cloth, which having been done, produces my composition in the form of a rich yellow salve that may be applied to the parts affected as ordinary salves are applied.

Having thus described my invention, what I claim as new, and desire to secure by Letters Patent, is—

The herein-described composition of matter to be used as a salve, consisting of rattlesnake's master, (*Agave Virginica*,) frog's oil, white rosin, hog's lard, and beeswax, in or about the proportions specified.

MARTHA E. AUSTIN.

Witnesses:
C. M. BEAR,
J. R. EDGETT.